April 1, 1924.
F. OUTREY
1,488,512
AUTOMATIC VARIABLE SPEED ADVERTISING CONTRIVANCE
Original Filed July 16, 1921
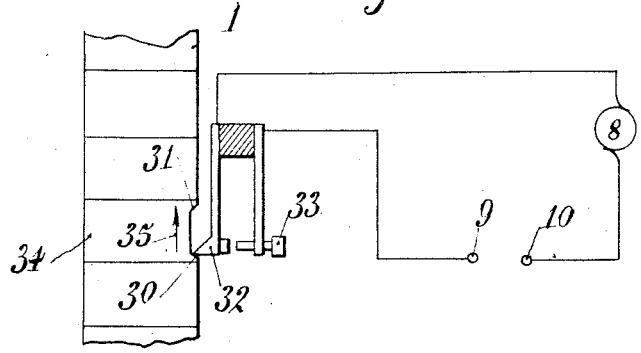
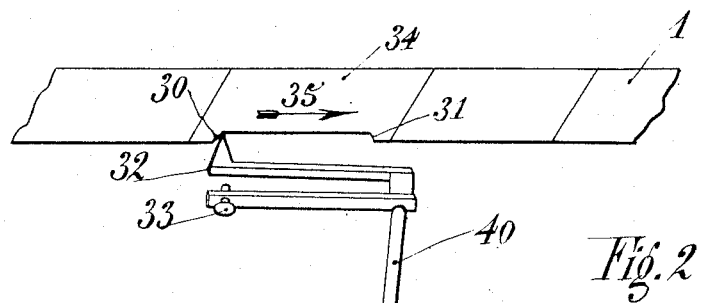
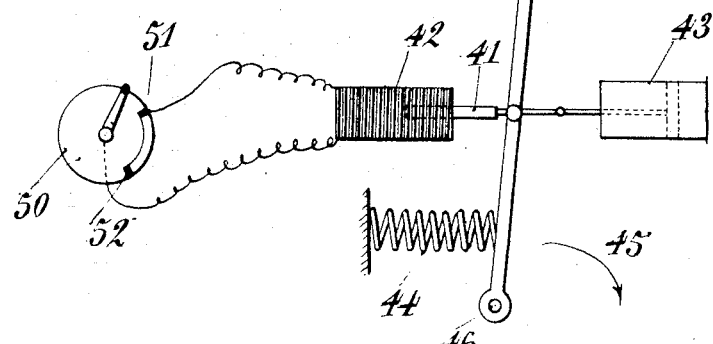
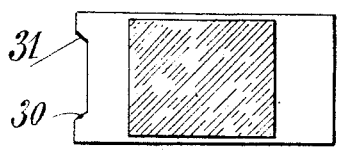
Inventor:
Fernand Outrey Patented Apr. 1, 1924.

1,488,512

UNITED STATES PATENT OFFICE.

FERNAND OUTREY, OF PARIS, FRANCE, ASSIGNOR TO PATHÉ-CINÉMA, ANCIENS ETABLISSEMENTS PATHÉ FRERES, OF PARIS, FRANCE, A JOINT STOCK COMPANY OF FRANCE.

AUTOMATIC VARIABLE-SPEED ADVERTISING CONTRIVANCE.

Original application filed July 16, 1921, Serial No. 485,229. Divided and this application filed July 7, 1923. Serial No. 650,196.

*To all whom it may concern:*

Be it known that I, FERNAND OUTREY, citizen of the Republic of France, residing at Paris, France, have invented certain new and useful Improvements in Automatic Variable-Speed Advertising Contrivances, of which the following is a specification.

My invention relates to automatic optical projecting apparatus such as described in my application, Ser. No. 485,229, filed July 16, 1921, of which this is a division.

The object of the present invention is to demonstrate, to impart instruction, and to advertise, by automatically effecting luminous projection with the minimum of apparatus and without danger.

Now imparting instruction requires the projection to be carried out at any speed suitable for demonstration, from a stoppage of several minutes duration to the quickest speed possible.

Likewise with advertising, it is frequently necessary to reproduce a movement in a very slow manner, in order that the demonstration can be properly followed.

One picture needs to be in view for a very short period, another, accompanied by long sentences or involving complicated designs, requires to remain longer visible.

The contrivance which forms the subject of the present invention has for its object to carry out the above described variable speed effects in projection with the assistance of an operator and simply by insertion of the film or slides, which themselves carry the means for controlling their speed of passage.

A contrivance according to the invention is illustrated by way of example on the accompanying drawing, in which:—

Fig. 1 is a plan of an assemblage of devices for regulating the speed of the film;

Fig. 2 is a perspective view of the movable contact controlling mechanism of the preceding assemblage;

Fig. 3 is a plan of a separate slide formed with a notch like the pictures of the film of Fig. 1.

The picture 34 of the film 1 (Figs. 1 and 2) is formed with a notch 30—31 of more or less length in accordance with the duration of arrest of the said picture before the projector. A contact member 32 is permanently connected by one of its ends in the circuit of an electromotor 8 and engages with its other end in the notch 30—31. When the end of the contact member 32 is engaged in the notch 30—31 the circuit of the electromotor 8 is opened, and on the contrary closes when the member 30 lifts on leaving the notch 30—31 and comes into engagement with an electric contact 33. The contact member 32 has imparted thereto a rectilinear movement of displacement parallel to the border of the stationary film.

The member 32 is fast with the contact 33 as regards its movements of translation parallel to the border of the film, such that these two members 32 and 33 are constantly opposite one another ready to come into mutual contact.

Various known mechanism can be employed for imparting to the assemblage 32, 33 the movements of translation parallel to the border of the film; for example (Fig. 2) the movable assemblage 32, 33 may be secured to one end of a lever 40 pivoted about an axis 46; this lever is on the one hand connected to a pneumatic dash pot 43 and on the other hand to the core 41 of a solenoid 42. The two leads of the solenoid 42 are connected to the terminals 51, 52 of a rotary commutator 50 which enables current to be sent at regular intervals through the solenoid 42. A returning spring 44 is compressed by the lever 40 and tends constantly to turn same in the direction of the arrow 45.

The above described device operates in the following manner:—In an initial position the picture 34 provided with the notch 30, 31 has been brought by the electromotor opposite the projector; the contact member 32 is engaged in the notch at 30; the contact between 32 and 33 is therefore interrupted and the circuit of the electromotor 8 is broken; the electromotor is consequently stopped and the picture 34 is rendered stationary in front of the projector.

The commutator 50 has at this instant interrupted the circuit of the solenoid 42, as indicated in Fig. 2, and the solenoid, which is no longer energized, ceases to attract the core 41 and the lever 40. The compressed spring 44 consequently actuates the lever 40 and turns same in the direction of the arrow 45 about the axis 46.

The lever 40 entrains with it the assemblage of the two movable contact members 32, 33 in the direction of the arrow 35 in a movement approximately parallel to the border of the film, until the contact member arrives at the end 31 of the notch 30, 31; this member then slides along the inclined border of this notch and is lifted until it bears against the lateral surface of the film. At this instant the electric contacts 32 and 33 come into engagement; the circuit of the electromotor 8 is closed; the electromotor recommences to rotate and substitutes for the picture 34 in front of the projector the succeeding picture of the film.

At the same time the rotary commutator 50 has closed the circuit of the solenoid 42; the solenoid 42, energized, attracts the core 41 and the lever 40 causing them to turn in the direction reverse to 45 about the axis 46. The lever 40 compresses the spring 44 and restores the assemblage of the two movable contact members 32, 33 to the position shown in Fig. 2, in which position the member 32 is engaged in the end 30 of the notch 30, 31 of the new picture substituted for the initial picture 34.

The dashpot 43 renders uniform the oscillations of the lever 40 about the axis 46.

The commutator 50 then breaks the circuit of the solenoid 42; the several elements of the device are therefore precisely in their initial positions, except that the picture 34 has been replaced by the succeeding picture of the film, and the same series of movements are reproduced.

It follows from the above description that the duration of arrest of a picture of the film in front of the projector is a function of the length of the notch 30—31.

The movement of the member 32 could be in the opposite direction, in which case it would be sufficient to provide a single nick at the point 31 or a hole if the member is displaced along the face of the film. The contact or the release would be effected when the movable member sinks into the nick or hole.

The above description has been made assuming the invention applied to a film. The same invention is applicable to independent slides capable of being independently projected or being placed in series on a chain, disc, band, etc.

Thus Fig. 3 shows a separate slide formed with an elongated notch 30, 31 like the various pictures of the film 1 of Figs. 1 and 2.

Claims:

1. In a luminous projection apparatus, pictures movable in front of the projector, elongated notches formed in said pictures, a movable control member engaging in said notches and controlling the mechanism for displacing said pictures, means imposing on said control member rectilinear reciprocating movements approximately parallel to the borders of said pictures.

2. In a luminous projection apparatus, pictures movable in front of the projector, elongated notches formed in the borders of said pictures, a contact lever engaging in said notches, said lever coming into or out of engagement with a movable contact accordingly as the said lever is disengaged from or engaged in said notch, an electromotor driving the displacing mechanism of the pictures, the circuit of said motor including said lever and said movable contact, means imposing on the assemblage of said lever and said contact rectilinear reciprocating movements approximately parallel to the borders of said pictures.

In testimony whereof I affix my signature.

FERNAND OUTREY.